United States Patent [19]

Scott

[11] 4,040,447

[45] Aug. 9, 1977

[54] PROTECTION OF PIPE AGAINST DAMAGE TO INSULATION AND/OR CORROSION

[76] Inventor: Gordon N. Scott, 608 N. Cannon Drive, Beverly Hills, Calif. 90210

[21] Appl. No.: 598,143

[22] Filed: July 23, 1975

[51] Int. Cl.² .......................... F16L 3/02; C23F 13/00
[52] U.S. Cl. .................................. 138/106; 204/147; 204/196
[58] Field of Search ............... 138/103, 105, 106, 110, 138/178; 174/10, 13, 25 R, 25 P, 37, 47, 163 R, 168; 204/147, 148, 196, 197

[56] References Cited

U.S. PATENT DOCUMENTS

| 294,354 | 3/1884 | Beckwith | 138/106 X |
|---|---|---|---|
| 2,707,984 | 5/1955 | Groff | 138/106 X |
| 2,850,182 | 9/1958 | Tetyak | 138/106 X |
| 2,954,332 | 9/1960 | Osborn et al. | 204/148 X |
| 3,026,076 | 3/1962 | Bender | 138/106 X |
| 3,254,012 | 5/1966 | Ziegler | 138/106 X |
| 3,410,772 | 11/1968 | Geld et al. | 204/147 |
| 3,484,349 | 12/1969 | Vrable | 204/147 |
| 3,553,094 | 1/1971 | Scott, Jr. et al. | 204/148 |
| 3,560,365 | 2/1971 | Mueller | 204/147 X |
| 3,725,225 | 4/1973 | Sudrabin et al. | 204/148 |

*Primary Examiner*—Richard E. Aegerter
*Assistant Examiner*—Richard R. Stearns
*Attorney, Agent, or Firm*—William W. Haefliger

[57] ABSTRACT

A mount extends in protective and supportive relation beneath an insulation covered pipe, to protect the insulation against damage. The mount defines a generally concave receptacle receiving the underside of the pipe and insulation, and it may consist of magnesium in electrical contact with supported steel pipe to inhibit corrosion of the latter.

14 Claims, 7 Drawing Figures

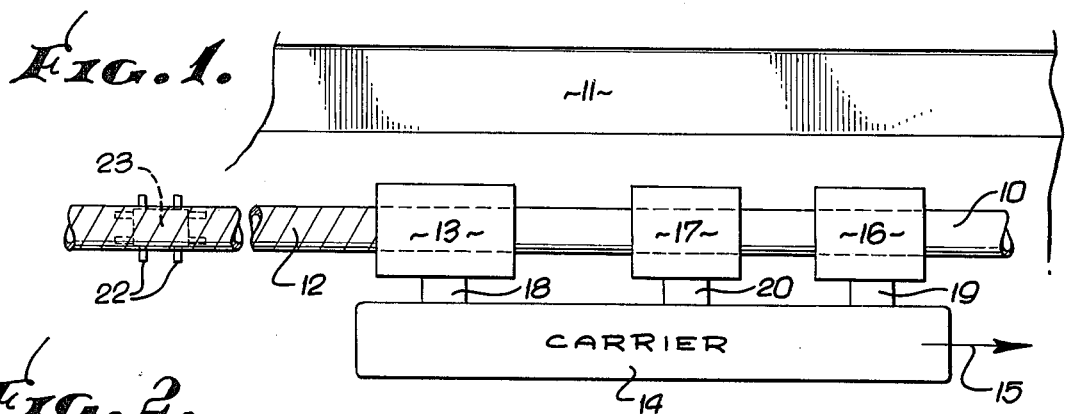
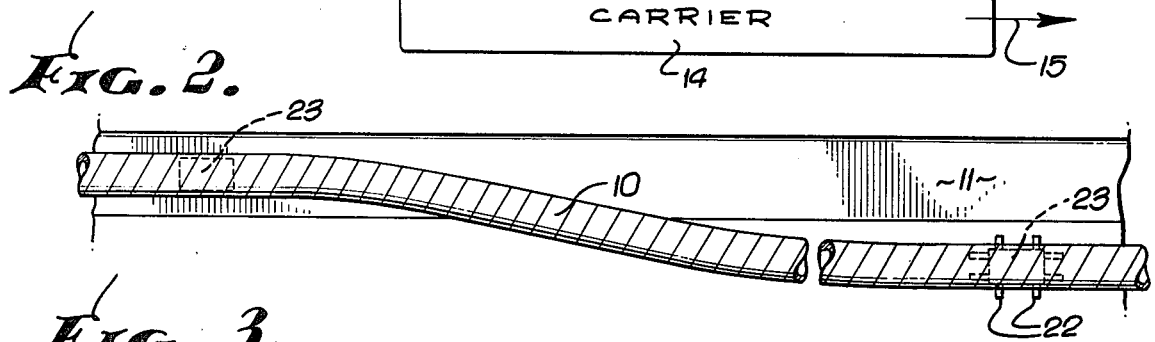
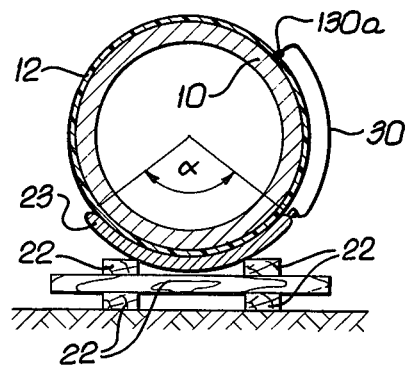
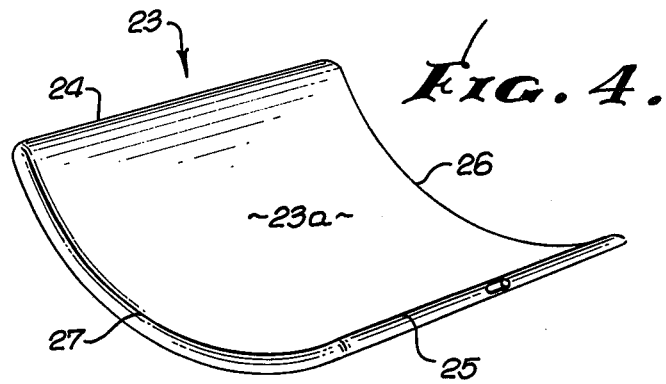
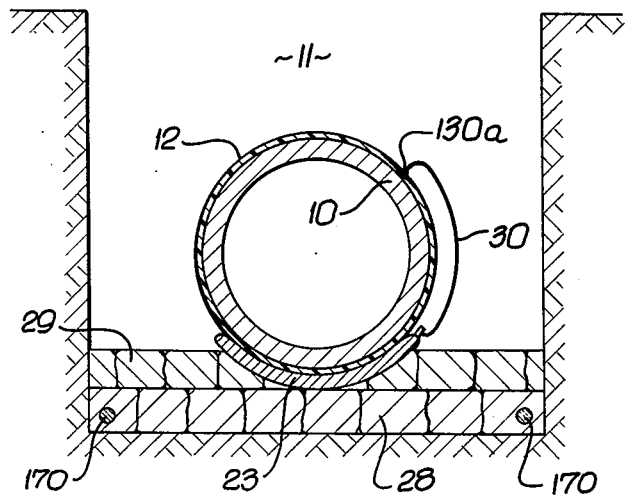
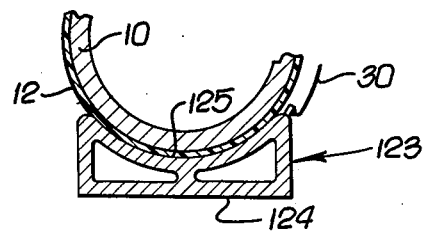
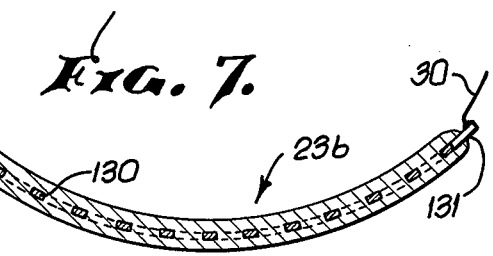

PROTECTION OF PIPE AGAINST DAMAGE TO INSULATION AND/OR CORROSION

BACKGROUND OF THE INVENTION

This invention relates generally to protection of pipe against damage to insulation and/or corrosion. More particularly it concerns mounting of the pipe in such manner as to alleviate either or both of these problems.

Pipelines are commonly insulated as by covering them with protective wrapping. In the case of heavy pipe, as for example is used for flowing petroleum or gas, the wrapping operation may be carried out prior to seating of the pipe in a trench, and skids may be used to temporarily support the insulated pipe. It is found that damage can and does frequently occur to the wrap as a result of gouging by edges on the skid members as the pipe is placed on or lifted off the skids, or moves endwise with temperature change.

Inadequate cathodic protection of metal pipelines, leading to corrosion, is another problem which commonly occurs. For example, it is found that the capability of zinc and other anodes, electrically connected with metal pipelines to provide cathodic protection, is diminished at elevated temperatures. Accordingly, when a pipeline is required to pass hot petroleum over long periods, as in artic regions, the pipe and its surroundings are heated by the petroleum and maintained at high temperatures, as for example 130° F to 150° F, and corrosion can result despite the attempted use of zinc anodes for cathodic protection.

SUMMARY OF THE INVENTION

It is a major object of the invention to provide solutions to the above problems and difficulties through the provision of a mount for the pipe characterized in that skid damage to the wrap is prevented and/or high temperature corrosion is prevented or inhibited. Basically, the mount is constructed to extend in protective and supportive relation beneath the insulation covered pipe, for interposition between the pipe and skids, the mount defining a generally concave receptacle in which underside extent of the pipe and its covering are protectively received. As will appear, the mount upper surface preferably has curvature closely conforming to that of the pipe underside, and the mount may be bonded to the wrap or covering so as to be transferable with the pipe onto and off the skids, and also into the trench to maintain protective integrity with the wrap.

Another important object is to provide electrical interconnection between the mount and the pipe where they have different metallic compositions characterized in that electrolytic current tends to flow preferentially from the mount to the pipe over the full temperature range of operation of the pipe. As will be seen, best results are obtained when body extent of the mount consists essentially of magnesium, the latter continuing to provide essential cathodic protection to the steel pipe at elevated temperatures, as for example 130° to 150° F.

These and other objects and advantages of the invention, as well as the details of an illustrative embodiment, will be more fully understood from the following description and drawings, in which:

DRAWING DESCRIPTION

FIG. 1 is a plan view showing pipe wrapping and supporting;

FIG. 2 is a plan view showing pipe laying;

FIG. 3 is an elevation showing pipe support on a mount and skids;

FIG. 4 is an enlarged perspective showing a typical mount;

FIG. 5 shows pipe supported on a mount in a trench;

FIG. 6 is an elevation showing a modified pipe mount; and

FIG. 7 is a section showing a modified mount.

DETAILED DESCRIPTION

Referring first to FIGS. 1 and 2, heavy metallic pipe 10, one example being a petroleum pipeline, is shown laid out next to a trench or ditch 11 into which the pipe is to be laid. The pipe is first covered or wrapped with insulation 12 and supported for subsequent introduction into the trench. For this purpose a known pipe-wrapping machine 13 may be employed. The latter is commonly transported along the pipeline by a carrier vehicle 14 movable in the direction of arrow 15. Vehicle 14 suspends the machine 13 and as well as known radiant and induction heaters 16 and 17, the suspension arms located at 18-20. Separate carrier vehicles may be employed. Heating of the pipe assures that the corrosion and protective and insulative covering such as spiral wrap 12 will adhere closely about the pipe metal, as for example steel, upon cooling; however, excessive damage to said heated wraps can occur upon placement onto skids. Illustrative wraps are produced by Raychem Corporation, and are known in the trade as ARCTI-CLAD. Other wraps or coverings are also usable, as for example those known as or produced by Johns Manville, Royston, and Polykem. (Kendall Company, Wellesley Hills, Mass.)

In accordance with the invention, mounts are provided to extend in protective and supportive relation beneath the insulative pipe, the mounts being in turn capable of support by skids such as are seen in FIG. 3. The skids may, for example, include wooden members 22 with edges or corners which otherwise tend to disrupt or injure the insulative wrap when the wrapped pipe is placed directly on the skids or removed therefrom for laying in the trench. The illustrated mounts 23 are spaced lengthwise of the pipe, and each mount defines a generally concave and shallow receptacle in which underside extent of the pipe, and the corresponding wrap, are received. Typically, the mount upper surface 23a has upwardly cylindrically concave curvature closely corresponding to downwardly convex curvature of the pipe and wrap so that the latter are substantially uniformly supported over the mount upper concave surface 23a preventing disruption of the wrap. Note in FIG. 4 that the edges 24-27 of the mount bounding upper surface 23a are typically chamfered or rounded to prevent wrap damage.

The mount is preferably bonded or attached in situ to the underside of the pipe wrap, so that it is transferred on and off the skids and into the pipe trench along with the pipe, as is clear from FIG. 5. As there shown, a rock or equivalent bedding is shown at 28 supporting the mount, there being additional bedding at 29 laterally supporting the mount. The bond may for example consists of an epoxy or other bonding agent, as for example that contained in or on the wrap itself.

A further feature of the invention concerns the provision of a mount with a body portion or extent of a composition different from that of the pipe itself, and characterized in that electrolytic current tends to flow preferentially from the mount body to the pipe when they are electrically interconnected. Such a connection may take the form of a suitably insulated copper or other electrical connector 30 having one end attached as by soldering to the mount and the other end attached to the pipe metal. After laying of the pipe, the trench may be back-filled, and any electrolysis that occurs, as for example due to dampness, will tend to corrode the mount, sacrificially, rather than the pipe metal. For best results, the mount body may consist essentially of magnesium, which maintains its preferential corroding capability at high temperatures, i.e. 130°–150° F encountered for example in oil pipelines in artic regions due to the presence of hot flowing oil in the line. Other metals such as aluminum and zinc are found to lose this capability at such higher temperatures, resulting in corrosion of the steel to which they are connected. The entirety of the mount or substantial body extent thereof may consist of cast magnesium.

Note that the cylindrical segment mount 23 subtends an angle α, as measured between edges 24 and 25 and from the center of the pipe, that angle being between about 75° and 135°. FIG. 6 shows a somewhat modified mount 123 having a flat underside 124 adapting the mount to seat flatly on the skids or on the bedding. The mount may be hollow, as shown, and may have a curved upper side 125 like upper side 23a in FIG. 4.

In FIG. 7, the metallic mount 23b has incorporated or embedded therein a metal electrode grid 130 which does not corrode or disintegrate at the rate of disintegration of the mount body. The grid is in electrical contact with substantial lengthwise and widthwise extent of the mount to make good electrical contact therewith, at all times. An external electrical contact appears at 131 for attachment to a wire as at 30 in FIGS. 3 and 5. The grid 130 may comprise a mesh or expanded metal lath which affords strength to the magnesium casting 23b and also assures its uniform and complete wastage as current flows to the pipe. To further this purpose the mesh may be galvanized to aid in directing the current to the pipe. The mesh may consist, for example, of steel or galvanized steel.

The insulated wire 30 connecting the pipe with the mount may be thermite welded at 130a to the pipe, and silver soldered to the contact 131 at the mount. All bare or exposed metal may be subsequently and appropriately insulated.

The relatively low density (1/5 that of steel) magnesium mount is accordingly lightweight and easy to handle.

Finally, under conditions where a zinc anode ribbon or ribbons have been or will be laid in the ditch parallel to the pipeline, the magnesium mounts will tend to delay or inhibit the reversal in potential of the zinc which may occur at elevated temperature. Examples of such zinc ribbons are shown in 170 in FIG. 5.

I claim:

1. In combination with a pipe having an insulative covering thereon,
   a. a sacrificially corrodable mount extending in protective and supportive relation beneath the covered pipe, the mount and pipe having respective body portions of different metallic composition,
   b. the mount defining a generally concave receptacle in which underside extent of the pipe and said covering thereon are received, in assembled relation thereto,
   c. a means electrically interconnecting said portions of the pipe and mount so that electrolytic current tends to flow preferentially from the mount to the pipe.

2. The combination of claim 1 wherein the mount upper surface has curvature closely conforming to that of the underside of the pipe and said covering, the underside of the pipe and said covering also having the same curvature.

3. The combination of claim 2 wherein the mount upper surface is bonded to the pipe covering at the underside of the pipe.

4. The combination of claim 2 wherein the mount underside defines flat plane.

5. The combination of claim 1 including a metallic mesh embedded in said mount to receive electrical current therefrom as the mount metal corrodes and to direct said current toward the pipe, the mesh connected to said means and having a metallic composition different from that of the mount, the mount and the mesh subtending substantial widthwise extent of the pipe.

6. The combination of claim 5 wherein the pipe consists essentially of steel.

7. The combination of claim 6 wherein said portion of the mount consists essentially of magnesium.

8. The combination of claim 7 wherein the mount has an upper surface with upwardly concave curvature closely conforming to the downwardly convex curvature of the pipe and said covering thereon.

9. The mount of claim 7 including an extended electrode in contact with said magnesium.

10. The combination of claim 7 wherein the pipe and mount extend underground, and including a zinc ribbon paralleling the pipe in relatively closely spaced relation thereto.

11. The combination of claim 1 including an electrical connector interconnecting the mount and the pipe metal, the connector extending through the insulative covering.

12. The combination of claim 1 including skid structure supporting the mount.

13. The combination of claim 1 wherein the mount has cylindrical segment shape.

14. A mount for use in combination with a metallic pipe having an insulative covering thereon, comprising
   a. a body defining a generally concave receptacle in which the underside of said covering is receivable in protected and supported relation,
   b. at least a portion of said body consisting essentially of magnesium, there being an extended mesh electrode in electrical contact with substantial lengthwise and widthwise extent of the body, the mesh electrically connected with the pipe.

* * * * *